July 19, 1949.    F. T. COURT    2,476,439
RELEASABLE POWER LIFT CONNECTION
Filed June 13, 1944
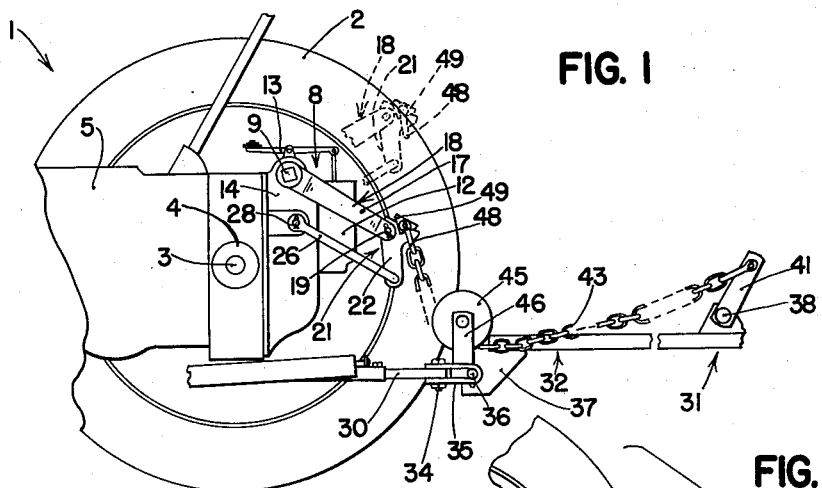
FIG. 1
FIG. 3
FIG. 2
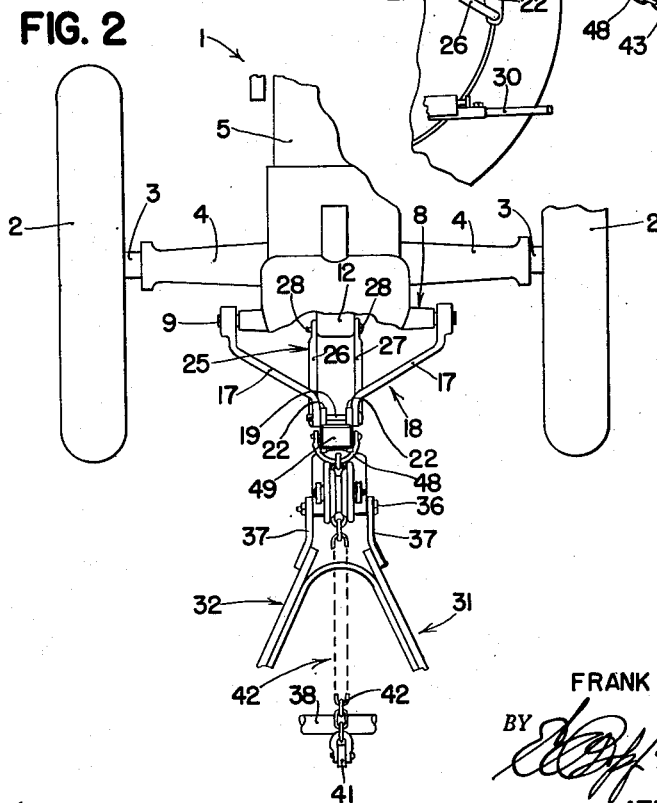
WITNESS
E. B. Bjurstrom
*INVENTOR.*
FRANK T. COURT
BY 
ATTORNEYS Patented July 19, 1949

2,476,439

UNITED STATES PATENT OFFICE 2,476,439

RELEASABLE POWER LIFT CONNECTION

Frank T. Court, Moline, Ill., assignor to Deere & Company, Moline, Ill., a corporation of Illinois Application June 13, 1944, Serial No. 540,115

5 Claims. (Cl. 97—50)

The present invention relates generally to agricultural implements and more particularly to towed implements, such as plows and the like, adapted to be connected in trailing relation to the rear of a propelling tractor.

The object and general nature of this invention is the provision of a new and improved connection between the tractor power lift and the implement part or parts to be adjusted, which connection is so constructed and arranged that, in the event the implement becomes disconnected from the tractor, as by the release of a spring trip hitch, break pin, or the like, the connection between the implement part or parts and the tractor power lift are also automatically disconnected. More specifically, it is a feature of this invention to provide an arrangement of this kind which permits free lateral swinging of the implement without imposing any variations in the position of the implement part or parts. Another feature of this invention is the provision of a releasable adjusting connection of this type wherein a member having a socket receives a connecting member seated therein, with mechanism for maintaining the angular position of said first mentioned member irrespective of swinging of the power lift arm, during the adjusting range of the tractor power lift.

These and other objects and advantages of the present invention will be apparent to those skilled in the art after a consideration of the following description of the preferred structural embodiment of this invention, taken in conjunction with the accompanying drawings.

In the drawings:

Figure 1 is a side view of a tractor and trailing implement in which the principles of the present invention have been incorporated.

Figure 2 is a fragmentary top view showing the particular construction of the power lift arm.

Figure 3 is a fragmentary view similar to Figure 1, showing the action of the disconnectible parts when the implement becomes disconnected from the tractor, as by an overload.

Referring now to the drawings, particularly Figure 1, the reference numeral 1 indicates a tractor which is of more or less conventional construction and hence has been illustrated only fragmentarily. The tractor 1 includes rear drive wheels 2 fixed to drive axles 3 that are journaled for rotation in a rear axle housing 4. The latter is secured to or forms a part of a transmission housing 5. The tractor 1 is equipped with a power lift unit 8 which includes suitable controlled hydraulic mechanism for actuating a power lift shaft 9. The hydraulic mechanism 8 also includes a valve box 12 and a valve control lever 13 by suitable actuation of which the power lift rockshaft 9 may be rocked into different positions and locked in that position or rocked into a raised position. The rockshaft 9 extends at opposite sides outwardly of a casing 14 that houses a substantial portion of the hydraulic mechanism.

Secured to each end of the power lift rockshaft 9 is a lifting arm 17. The two arms 17 converge rearwardly and are connected together by a transverse central section 19 which, with the arms, form a lifting arm or bail indicated in its entirety by the reference numeral 18. A lifting member 21 is suspended from the central section 19 of the lifting arm 18 and is in the form of a generally vertically arranged yoke formed with a pair of plates or sides 22, the upper edge of each of which has a notch 23. The spaced apart notches 23, taken together, constitute a block-receiving socket at the upper end of the member 21 and arranged rearwardly of the bail or arm 18. The lower portion of the lifting member 21 is pivotally connected to the rear end of a guiding link member 25, which preferably includes right and left sections 26 and 27 having eyes at their forward ends by which the member 25 is pivoted to studs 28 carried on the power lift housing 14 or some other suitable location on the tractor, preferably substantially underneath the power lift shaft 9 so that the link member 25 can be disposed in generally parallelism with respect to the power lift arm member 18. As a result of this construction, up and down swinging of the arm 18 raises and lowers the member 21 but the link 25 maintains the member 21 in a given angular relationship. In other words, the member 21 always moves into parallel positions. The purpose of this will be explained below.

The tractor 1 includes a drawbar 30. The implement, which is indicated in its entirety by the reference numeral 31, is hitched to the tractor drawbar 30 by means of a hitch frame 32. The implement 31 and its hitch frame 32 is largely of conventional construction and hence only a brief description will be necessary to a complete understanding of the present invention. The hitch frame 32 is preferably connected with the tractor by a break pin 34 or any other suitable releasable connection, such as a spring release trip device, and a clevis 35 which receives the break pin 34 may be pivoted, as at 36, to hitch plates 37 which are secured to or form a part of the implement frame 32. The latter carries suitable ground working tools (not shown) the position of which are controlled by a rockshaft 38 which is mounted for rocking movement on the frame 32 and connected with the tools in any suitable way. An arm 41 is fixed to the rockshaft 38 for rocking the latter. A tension connection, indicated in its entirety by the reference numeral 42, extends from the arm 41 up to the lifting member 21. This tension connection comprises a flexible element, such as a chain 43, which is connected at its rear end to the arm 41. The chain 43 extends forwardly and passes over a sheave 45 mounted for rotation on a yoke 46 that, in turn, is fixed as by welding, to the clevis 35 that serves as a part of the implement. The forward end of the chain extends upwardly in front of the sheave 45 and is connected by a swivel 48 to a pull-off block 49 of generally V-shaped section, so that the pull-off block 49 seats in and normally rests in the notches 23. The operation of the form of the invention shown in the drawings is substantially as follows. The parts as shown in Figure 1 are in their operating or lowered position. When it is desired to raise the tools or otherwise adjust or shift the part that is adjustable or shiftable on the implement 31, the operator steps on the lever 13 which, through the power lift unit 8, swings the lifting arm or bail 18 upwardly, substantially into the position indicated in dotted lines in Figure 1. Since the links 17 and 26, 27 are parallel, the lifting member 21 remains in its same angular position, as shown in Figure 1. By virtue of this construction, the rear sides 23a (Figure 3) of the notches 23 always lie at the same angle, which is a position that slopes upwardly and rearwardly. In the event the pin 34 should break, the tractor begins to move away from the implement so that the pull between the tractor and the implement is momentarily exerted directly from the notch 23 through the chain 43 to the implement. For an instant the front end of the frame is raised so that the pull through the flexible element 42 is substantially directly rearwardly. The slope 23a of the part 21 is so chosen that when the pull is exerted in this manner, the block 49 readily slips out of the notch 23. Yet, as shown in full lines in Figure 1, when the implement is connected to the tractor the front section of the chain 43 normally extends substantially directly downwardly from the notch 23 practically in line with the pivot axis 34 about which the implement 31 may swing laterally with respect to the tractor. When the pull is exerted in this latter direction, the block 49 cannot, of course, become disengaged from the notch 23 since the pull normally holds the block in place. However, when the pull is exerted substantially directly rearwardly, as shown in Figure 3, the block 49 readily slips out of the notch 23, thus disconnecting the pulling connection between the power lift 8 on the tractor and the part on the implement that is controlled thereby. Such release is, of course, dependent upon the release or breaking of the pin 34. In this respect the break pin 34 represents any form of connection that serves to release the implement from the tractor, as by an overload, or otherwise. Since the front section of the chain extends substantially directly upwardly from the pin 34 to the socket 23, the implement is free to swing laterally relative to the tractor without in any material way affecting the connection between the tractor carried power lift 8 and the implement controlling means 41, 42.

What I claim, therefore, and desire to secure by Letters Patent is:

1. For use in the combination of a tractor having a generally vertically swingable power lift arm, an implement having a part to be shifted, a hitch connection releasably connecting said implement with the tractor generally at a point below said vertically swingable arm, and a flexible motion-transmitting means extending from said implement part to be shifted to a part adjacent the hitch connection between the implement and the tractor and then generally directly upwardly: a member adapted to be carried by said arm for pivotal movement relative thereto, said member having a block-receiving saddle section, link means generally parallel with respect to said power lift arm and adapted to connect said member with the tractor so as to maintain the angular disposition of said member substantially constant when the tractor power lift arm swings, and a release block disposed in said saddle section and receiving the forward end of said connecting means extending from the implement, the angularity of the wall of said saddle section being such that upon the release of the implement from the tractor, as by an overload, said connecting means exerts a force tending to dislodge the block from said saddle section.

2. For use with an implement adapted to be connected with a tractor and having a part to be adjusted, an overload hitch connection for releasably connecting said implement with the tractor, and a flexible connection extending from said part forwardly of the implement and then generally upwardly: an adjusting member mounted on the tractor and including a hook-like section, said connection including a block adapted to releasably fit in said hook-like section, the angle of the latter and the associated portions of said block being such that when said connection extends generally upwardly toward said hook-like section, said block remains in said hook-like section, but when the implement is released from the tractor and said connection extends toward said member in a more nearly horizontal direction, continued travel of the tractor will cause said connection to become disconnected from said adjusting member by pulling said block out of said hook-like section.

3. For use in a towed implement having a part to be adjusted and adapted to be connected to a tractor having a source of power and a power operated unit thereon: a pair of generally vertically spaced upper and lower swingable parallel links, one adapted to be operated by said unit, a connection-receiving member carried by the swinging ends of said links, a generally vertically arranged member releasably connected at its upper end with said connection-receiving member and adapted to act in tension, and in a generally vertical direction so long as the implement is connected with the tractor, between said parallel links and said implement adjustable part, said parallel links serving to maintain said connection-receiving member in a given angular position with respect to the tractor, and means responsive to a change in the angular position of said generally vertically arranged member relative to the tractor for disconnecting the upper end of said generally vertically arranged member from said connection-receiving member.

4. For use with a tractor having a power lift part: a connection-receiving member adapted to be pivotally connected with said power lift part, means for maintaining said connection-receiving member in a constant angular position relative to the tractor during movement of said power lift part, comprising a link pivoted to said member and adapted to be pivoted to said tractor generally in parallelism with said part, said member having an upwardly facing socket, and a connection block releasably disposed in said socket.

5. For use with a tractor having a power lift part and an implement detachably connected with said tractor and including an adjustable part movable relative to the tractor in a line that extends generally vertically: a connection-receiving member adapted to be pivotally connected with said power lift part and including an upwardly facing socket having a wall that extends upwardly and rearwardly, means for maintaining said connection-receiving member in a substantially constant angular position relative to the tractor during movement of said power lift part comprising a link pivoted to said member below said socket and adapted to be pivoted to said tractor generally in parallelism with respect to said power lift part, and a connection block adapted to receive said vertically movable implement part and releasably disposed in said socket so that said vertically movable implement part moves in a line which makes an acute angle with respect to said upwardly and rearwardly extending wall of said socket, when the implement is attached to the tractor, said implement adjustable part being adapted to move in a line which makes an obtuse angle with respect to said socket wall when the implement is detached from the tractor while the connection block remains in said socket.

FRANK T. COURT.

REFERENCES CITED

The following references are of record in the file of this patent:

UNITED STATES PATENTS

| Number | Name | Date |
| --- | --- | --- |
| 1,312,281 | Springer | Aug. 5, 1919 |
| 1,971,180 | Graham et al. | Aug. 21, 1934 |
| 2,283,377 | Lindgren et al. | May 19, 1942 |
| 2,368,125 | Evans | Jan. 30, 1945 |
| 2,368,266 | Silver | Jan. 30, 1945 |

FOREIGN PATENTS

| Number | Country | Date |
| --- | --- | --- |
| 338,177 | Germany | June 14, 1921 |